United States Patent Office 3,352,795
Patented Nov. 14, 1967

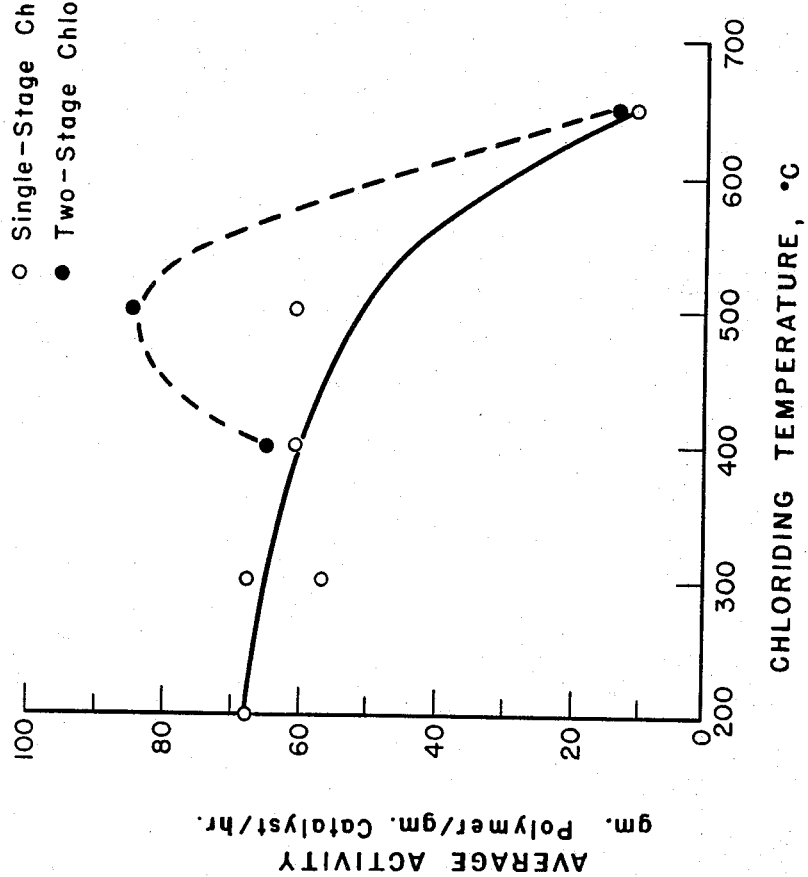

3,352,795
MOLYBDENUM OXIDE POLYMERIZATION
CATALYST
John W. Shepard, Yokohama, Japan, and Edwin F. Peters, Lansing, and Omar O. Juveland, South Holland, Ill., assignors to Standard Oil Company, Chicago, Ill., a corporation of Indiana
Filed Feb. 16, 1966, Ser. No. 527,804
5 Claims. (Cl. 252—442)

This is a continuation-in-part of application S.N. 255,213, filed Jan. 31, 1963, and now abandoned, which itself is a continuation-in-part of application S.N. 201,272, filed June 11, 1962, now abandoned.

This invention relates to the polymerization of terminal vinyl olefins to produce normally solid polymers, and more particularly is concerned with providing an improved catalyst system for such polymerization.

In accordance with our invention, terminal vinyl olefin monomers are polymerized to normally solid polymers by effecting polymerization in liquid phase with a catalyst system comprising (a) a minor amount of an oxide of molybdenum in a sub-maximum valence state, supported on high surface area alumina, which has been contacted before use with a hydrogen halide in the vapor phase at multiple temperature stages within the range of about 150 to about 500° C. and (b) either sodium metal, lithium metal, or calcium metal.

It appears that our novel "hydrohalogenation" treatment operates mainly in conjunction with the alumina support; careful removal of molybdenum halides and oxyhalides from treated catalyst by sublimation or by washing with naphtha does not significantly affect catalyst system activity. There are, however, unique interrelationships among the support, the molybdena, and the sodium, lithium or calcium promoter, discussed hereinbelow.

It is essential that the metal oxide component of our catalyst system be molybdenum. Other metals of Groups 6 of the Periodic Table (Moeller, "Inorganic Chemistry," Wiley, 1952, page 122), viz. chromia and tungsten, do not give similar satisfactory results. Chromia hydrohalogenates too rapidly, and an excessive quantity of chromia—presumably in the form of a volatile and soluble oxyhalide—is removed from the catalyst. Indeed, we have found that hydrochlorination of unpromoted hexavalent chromia on silica kills its catalytic activity. Tungsten produces polymers of excessively high molecular weight, unuseable for most molding applications. Further, it is required that the average valence of the molybdenum for our catalyst system be below 6.0 (by dichromate titration in 50% $H_2SO_4$); this is sometimes referred to herein as a "sub-maximum valence state" or "sub-hexavalent" molybdena.

It is also important that the molybdenum be supported on a high surface area alumina base. The base or support may either consist of or substantially comprise alumina, but other supports such as silica, heretofore reported as more or less equivalent, are not satisfactory when used in conjunction with sodium promoter.

Sodium, lithium or calcium promoters or components of the catalyst system bear a relationship to the molybdena on alumina in our catalyst not shared by other Group 1 and 2 metals. Potassium, for example, produces excessive amounts of low molecular weight greases and oils during polymerization; cesium and rubidium cause side reactions which reduce polymer yield and increase the difficulty of obtaining satisfactory polymer quality.

Undoubtedly the most distinctive aspect of our invention is the effect of staged hydrohalogenation on sub-hexavalent molybdena on alumina. It has long been recognized in the patent literature that halogens have an empirical effect on polymerization catalysts; with some catalysts there is no disclosed tendency toward either enhancement or deactivation (U.S. 2,944,049) while with others there is improvement, ranging from marginal (U.S. 2,825,721) to good (U.S. 2,725,374). On the other hand, with still other polymerization catalysts, halogens are said to be poisons (U.S. 3,008,938).

We have found that in cases where halogens can act as catalyst promoters, hydrohalogenation temperatures affect catalyst activity. An effective hydrohalogenation treatment temperature range is from about 150 to about 500° C., optimally about 200 to about 500° C., in stages, preferably first at about 300° C. and then at about 500° C. There is little detectable catalyst activity improvement at temperatures significantly below 150° C., and at temperatures substantially above 500° C., e.g., 700° C., there is an actual activity decline. We have found an improved molybdena-alumina catalyst is obtained in accordance with our invention when staged temperature hydrohalogenation is employed, as compared to catalysts obtained from ordinary single temperature hydrohalogenation. We have found that the temperature stages selected should be near certain preferred values for best results and that the temperatures should be staged in ascending order. More particularly, we have found that a first hydrohalogenation treatment should be conducted near 300° C. for a period of time varying from about 0.25 to 5.0 hours and a second hydrohalogenation should be conducted near 500° C. for a similar period of time. Surprisingly, we have found that second stage hydrohalogenation treatment at 400° C. produced no activity benefit in catalyst while second stage hydrohalogenation at 550° and 650° C. produced substantial losses in catalyst activity. We are not certain of the mechanism by which the catalyst hydrohalogenation produces such results, but it may be that there are two requirements for improved catalyst activity, one being the uncovering of catalytically active sites by removal of some molybdenum and the second being a fixing or stabilizing of chloride on the support. The first of these results requires a relatively lower temperature and the second a relatively higher temperature, and their successful accomplishment requires that the temperature stages be used in ascending order. Examples presented hereinbelow show the beneficial results of our catalyst treatment upon the yield of polymer in catalytic polymerization using treated catalyst.

We have found it highly advantageous to conduct our novel polymerization reaction under solution polymerization conditions, although the promoted hydrohalogenated molybdena on alumina is useable for both solution and suspension polymerization. For the homopolymerization of ethylene, for instance, temperatures from 0° C. to about 95° C. produce the polymer as an unfused popcorn-like material; this is referred to as "suspension" or "precipitation" polymerization. However, at temperatures above about 110° C. to about 300° C., and particularly when a substantially inert reaction medium is employed during the polymerization (this is not necessary with monomers higher than ethylene), the polymer dissolves in the reaction mixture to form a quasi-homogeneous solution; this is "solution" polymerization. At a temperature of about 100° C. the polymer fuses around the catalyst particles but does not dissolve; its activity at about 100° C. is frequently as little as one-fourth its activity at temperatures ten or fifteen degrees in either direction.

Terminal vinyl olefin monomers which may be polymerized with our novel catalyst system to obtain normally solid polymers are monoolefins and diolefins having the formula $RHC:CH_2$, where R is hydrogen or an alkyl, alkenyl, or aryl group, or combinations of such groups. Preferred feedstocks are the terminal vinyl olefins containing from two to eight carbon atoms, inclusive, per molecule. Suitable feedstocks comprise ethylene, propylene, 1-butene, 1-pentene, 1-heptene, 1-octene, 1-dodecene, 1-tetradecene, 1-hexadecene or their mixtures and the like. Examples of isoalkyl ethylenes which can be used as components of polymerization feedstocks are 3-methylbutene, 4-methylpentene, 5-methylhexene or their mixture with each other or with normal 1-alkenes, and the like. Aryl olefins may also be used, and are exemplified by styrene, alpha-methyl styrene, and the like. Suitable diolefins include butadiene, piperylene, isoprene, etc. The alkene monomers can be co-polymerized with suitable polymerizable comonomers, for example, aryl ethylenes such as styrene, Ar-halostyrenes, Ar-alkylstyrenes and the like. Other suitable comonomers comprise conjugated dienes such as butadiene, isoprene, chloroprene, piperylene, cyclopentadiene or the like. Other comonomers include tetrafluoroethylene, perfluorovinyl chloride or the like. Miscellaneous alkene charging stocks which can be polymerized by the process of the invention include norbornylene, 4-vinyl-cyclohexene, vinyl cyclohexane or the like.

In general, our novel process finds its greatest current utility in the conversion of normally gaseous 1-alkenes, alone or with suitable comonomers, to form normally solid waxy or tough resinous material suitable for uses of known commercial plastics, as in the conversion of ethylene to resinous polyethylenes; ethylene-propylene mixtures to form resinous copolymers having densities (24/4° C.) within the range of about 0.92 to 0.97 gram per cc.; propylene to form normally solid, resinous polypropylenes containing both amorphous and crystalline components; 1-butene to form waxy-to-resinous polymers; ethylene-1-butene mixtures to form normally solid copolymers and the like. Copolymers prepared from ethylene and a minor amount of other alpha olefins such as propylene or butene-1 may be relatively stiff, resembling polyethylene in appearance and properties. Copolymers of ethylene with a major amount of alpha olefins, advantageously with small amounts of diolefins, are amorphous rubbery materials.

The olefin charging stock used in our process may contain unreactive diluents such as saturated hydrocarbons of similar or identical boiling range, for example, as found in alkenes or their mixtures derived from petroleum refining operations. Since water, oxygenated compounds, such as carboxyl compounds, ogygen, etc., can act as catalyst poisons these are preferably eliminated from the feed by prior treatment, as for example with 4 Angstrom molecular sieve, silica gel, etc. The olefin charging stock may be in solution in a substantially inert liquid reaction medium in a concentration in the range of about 1 to about 25 percent by weight of the total solution. Higher concentration, e.g. up to 100 percent, may if desired be employed, as for example in the polymerization of propylene where no inert liquid need be present.

A substantially inert liquid reaction medium is desirably employed during the polymerization. This liquid is preferably a normally liquid saturated aliphatic or aromatic hydrocarbon but can be a relatively unreactive alkene (containing a non-terminal double bond) or in some instances, a cycloalkene, a perfluorocarbon, a chloroaromatic or mixtures of such suitable liquids. By "substantially inert liquid reaction medium," we mean liquids which remain liquid under polymerization conditions and which do not substantially interfere with the reaction or deleteriously affect the resultant polymer.

Polymerization conditions include temperatures within the range of about 0° C. to about 300° C., the preferred conditions being above about 110° C. Optimum temperatures are largely dependent upon the particular catalyst employed. When polymerization is effected at relatively high (110–300° C.) temperatures, and particularly but not exclusively when the liquid reaction medium comprises hydrocarbon, most polymers are produced in the reaction mixture as liquids or gels, miscible with, or soluble in, the liquid reaction medium.

The concentrations of molybdena on alumina catalyst and sodium, lithium or calcium co-catalyst are not critical. The proportion of catalyst (including support) based on the weight of olefin feedstock can range from 0.1 weight percent to 20 weight percent or even more. The co-catalyst may, illustratively, be present in a molar ratio of from 100:1 to 1:1 based on the molybdena.

The molybdena on alumina catalyst, with which our invention is concerned, is subhexavalent molybdena on a support comprising or consisting of alumina, preferably the eta and/or gamma phase forms. The molybdena content is usually in a weight ratio to alumina support of about 1:20 to about 1:1, and suitably about 1:10. For much of the present work, the molybdena content is between about 5 to about 35 weight percent of the total molybdena plus alumina support.

Although it is desirable to employ pure alumina for the base or support, in some instances minor, or even major, amounts of materials such as silica, zirconia, titania or cobalt oxide may be present so long as there is no substantial deleterious effect. It is, however, advisable to employ pure alumina having a surface area (as measured by BET low temperature nitrogen adsorption isotherm method) in excess of 100 square meters per gram of support. The molybdena may be composited with the support by any suitable technique, e.g. impregnation, cogellation, coprecipitation, etc.

The hydrogen halide treating agent for our catalyst may be employed in any convenient concentration and at any convenient pressure. Thus the concentration may range from as little as 0.5 percent to 100 percent hydrogen halide, the balance being preferably a gas which is neither oxidizing nor reducing; nitrogen or the rare gases such as argon or helium are suitable. A moving stream of gas appears to be preferable, as it carries away any volatile transition metal halides or oxy-halides formed during the first stage hydrohalogenation.

Suitable hydrogen halides are hydrogen chloride, hydrogen bromide, hydrogen iodide, and hydrogen fluoride, singly or in combination. Hydrogen fluoride is known to react with alumina as well as most of the transition heavy metal oxides to form volatile compounds which are carried out of the treating zone in the gas phase.

The hydrogen halide treating agent and the inert gas diluent, if any, appear to be most effective when employed in the absence of any moisture, although this is not a mandatory requirement. Treatment at atmospheric pressure is most convenient, although the treating pressure may range from as little as 0.01 atmosphere hydrogen halide partial pressure to as much as 10 atmospheres or more. Included within the scope of the invention are substances which are capable of producing hydrogen halide by reaction on the catalyst, e.g. fluoro-phosphoric, fluorosulfonic acid, chlorosulfonic acid, etc.

Catalyst is generally oxidized, before our hydrogen halide treatment, using oxidation conditions ranging from about 300 to 600° C., preferably about 400–550° C., and suitably 450–525° C., for a period ranging from about 0.01 to about 20 hours or more, optimally about 1–2 hours. The oxygen partial pressure may range from as little as 0.01 atmosphere to 10 atmospheres or more, with either pure oxygen or diluted oxygen being suitable. Calcination in air at atmospheric pressure is both convenient and effective. This oxidation converts molybdenum in the catalyst to hexavalent molybdena which is a convenient starting point for partial reduction. Reduction of a calcined molybdena catalyst to a sub-maximum valence state may be effected with any reducing gas, e.g. hydrogen, CO, $SO_2$, or a hydrocarbon, at temperatures within the range of about 300–600° C., preferably about 400–500° C., for a time ranging from about 0.01 to about 20 hours, e.g. 0.25–1.0 hour. The time, temperature, and nature of the reducing agent are correlated to afford the desirable average valence state of the transition metal oxide component, and this is readily determined by simple experimentation.

Catalyst treated as above may be employed directly in a polymerization reaction, suitably after comminution to particle size ranging from about 60 to about 200 mesh. It is desirable to exclude oxygen from the treated catalyst.

Various aspects of our invention are illustrated in the ensuing working and illustrative examples. In the experiments recorded below, finely divided sodium metal is the promoter, although equivalent results are obtained when lithium or calcium metal replaces all or part of the sodium. It is to be understood that the examples are for illustration only, and are not intended to be wholly definitive or exclusive with respect to scope or conditions of our catalyst treatment, novel catalyst and catalytic process.

POLYMERIZATION PROCEDURE

A typical polymerization procedure is described below. Rinse solvent was left standing in the reactor overnight at 170° C. under slight nitrogen pressure. This was "odorless mineral spirits," a sulfuric acid treated naphtha consisting essentially of alkanes having a boiling range of 168–190° C., hereinafter called OMS. The rinse solvent was discharged from the reactor, which was then washed once with 400 ml. of laboratory purified OMS. Catalyst and promoter were then separately charged under nitrogen blanket to the reactor from the separatory funnel along with 425 ml. of fresh OMS. Residual traces of air were flushed out through a reactor vent line with high purity inert gas introduced simultaneously into the liquid and vapor phases. About 25 ml. of hot solvent was flashed from the reactor during this operation. Net OMS was 400 ml. or 300 g. The reactor was closed, the pressure adjusted to 30 p.s.i.g. with inert gas and heating and stirring was begun.

At about 10° C. below desired reaction temperature, ethylene from the main storage cylinder was charged to the liquid and vapor areas of the reaction until the operation pressure was reached (3–5 minutes). Final pressure adjustment was made from the weighed ethylene feed cylinder when necessary. The ethylene supply was then closed and the first weight on the ethylene feed cylinder recorded. With excess heat capacity in the reactor walls, reaction temperatures usually lined out within 5–10 minutes. Subsequent monomer was continuously added beneath the liquid level in the reactor. Weight losses in the ethylene feed cylinder were recorded at fifteen minute intervals until the rate pattern had been established. Recordings thereafter were adjusted to the level of observed activity.

Polymerization usually continued for two hours or until observed monomer uptake just exceeded 60 g. (17% polymer). The hot polymer solution was then discharged to a dilution vessel with the aid of high pressure nitrogen. The reactor was vented, and a first rinse of 750 ml. OMS charged to wash out residual polymer left in the system. Experience showed that two such rinses were necessary to remove all the polymer. Each rinse operation required about thirty minutes; minimum rinse temperature was 170° C. The hot rinsings were added to the main product in the dilution vessel for filtering through a cellulosic medium, under pressure. The dilution vessel was rinsed once with 3-liters of hot OMS at 170° C. before discharging the next product into it. Filtrate was cooled to precipitate polymer at room temperature and polymer was washed with hexane to remove OMS prior to vacuum oven drying to constant weight.

In the study of methods of catalyst treating which affect the polymerization activity of that catalyst, it is essential that polymerization conditions be reasonably fixed so that process variables do not influence activities. This was particularly true of purity levels within the polymerization system. In order to insure stabilized conditions, the polymerization system was frequently checked against chlorided or non-chlorided catalysts having a previous history.

Examples

These examples illustrate the polymerization procedure as applied to ethylene polymerization with a sodium-metal promoted molybdena-on-alumina catalyst, made with single stage hydrohalogenation. Activating agents are HCl and HBr.

The catalyst is a nominal 10–11 percent $MoO_3$, cogelled with alumina (Harshaw 1101 P). Before use it is calcined in a stream of air or oxygen in a rotary furnace at 500° C. for 1–2 hours at atmospheric pressure, and then reduced to a valence state of less than 6 with a hydrogen gas stream at 400–500° C. for 0.25–1.0 hours. Activation is employed either before or after reduction, as shown in Table I, which presents single stage hydrohalogenation experiments for comparison with experiments tabulated in Table II which show the advantages realized in accordance with our invention.

Activation consists in passing a stream of anhydrous hydrogen halide in argon over the catalyst in the range 200–650° C. for 0.25–3.0 hours, as shown in the tables, so as to achieve halogen content in the final catalyst.

Reaction conditions for the polymerizations are: 1000 p.s.i.g. ethylene pressure, 275–280° C., 300 g. odorless mineral spirits, 0.1 g. dispersed sodium promoter, and 1.0 g. catalyst, unless otherwise noted.

The following results were observed.

TABLE I.—ETHYLENE POLYMERIZATION

| Experiment Number | Chloriding Conditions | | Percent Molybdena | | Percent Cl | Activity,[1] g./g./hr. |
|---|---|---|---|---|---|---|
| | ° C. | Hrs. | Before | After | | |
| 1 | 300 | 3.0 | 10.42 | 7.74 | 2.30 | 68 |
| 2 | 200 | 1.0 | 10.79 | 8.97 | 2.89 | 68 |
| 3 | 300 | 1.0 | 10.79 | 7.81 | 2.04 | 57 |
| 4 | 650 | 0.5 | 10.42 | 8.06 | 1.71 | 11 |
| 5 | 500 | 1.0 | 10.42 | 8.18 | 1.97 | 61 |
| 6 | 400 | 1.0 | 10.42 | 8.18 | 1.87 | 61 |

[1] Grams of polymer produced per gram of catalyst per hour.

The above results are presented on the figure as the curve labeled "single stage chloriding."

Similar polymerizations were conducted using catalysts subjected to two-stage chloriding according to our invention. These catalysts were portions of catalysts prepared in Examples 1, 2 and 3 of Table I, subjected to additional treatments as shown in Table II. The catalyst activities for two-stage chloriding are plotted against final chloriding temperature in the figure. Three additional experiments performed with two-stage chloriding at 300° C. and 500° C., are tabulated for illustrative purposes, but our results are not shown in the figure, for clarity.

TABLE II.—ETHYLENE POLYMERIZATION

| Experiment Number | Chloriding Conditions | | | | Percent Molybdena After 2d Chloriding | Percent Cl⁻ | Activity, g./g./hr. |
|---|---|---|---|---|---|---|---|
| | First Stage | | Second Stage | | | | |
| | °C. | Hrs. | °C. | Hrs. | | | |
| 1A | 300 | 3.0 | 500 | 1.0 | 7.71 | 2.17 | [1] 84 |
| 2A | 200 | 1.0 | 400 | 1.0 | 9.36 | 2.25 | [1] 64 |
| 3A | 300 | 1.0 | 650 | 1.0 | 4.90 | 2.64 | 13 |
| 7 | 300 | 3.0 | 500 | 1.0 | 7.32 | 2.31 | [1] 82 |
| 8 | 300 | 1.0 | 500 | 1.0 | 7.98 | 2.50 | [1] 82 |
| 9 | 300 | 1.0 | 500 | 1.0 | 7.99 | 2.52 | [1] 92 |

[1] 0.5 g. catalyst used for indicated runs.

Similar improvement in catalyst activity is shown when propylene, mixtures of ethylene and propylene and other 1-alkenes, alone or in admixture are used in polymerizations conducted in accordance with our invention.

From the above examples, it is apparent that catalysts activated pursuant to our invention possess substantially enhanced activity in comparison with prior art molybdenum oxide catalysts. Frequently the improvement in polymerization rate is by a factor of from 2 to 4 and even higher. It is evident that our invention provides a markedly improved olefin polymerization catalyst.

While our invention has been described in conjunction with specific examples, it is to be understood that these are for illustrative purposes only. Many alternatives, modifications, and variations will be apparent to those skilled in the art in light of the foregoing description, such alternatives, modifications, and variations falling within the spirit and scope of the appended claims.

Having thus described our invention, what we claim is:

1. As a composition of matter, a catalyst useful for the polymerization of 1-alkenes to normally solid polymers, which comprises (a) a minor amount of an oxide of molybdenum in a sub-maximum valence state, supported on (b) a major amount of a high surface area alumina, said oxide in combination with said alumina having been contacted with a hydrogen halide in the vapor phase at a first temperature of about 300° C. for at least about 0.25 hour and at a second temperature of about 500° C. for at least about 0.25 hour and (c) a member of the group consisting of sodium, lithium and calcium.

2. The composition of claim 1 wherein the molybdenum oxide content prior to hydrohalogenation is about 10 weight percent and after hydrohalogenation is in the range of about 7 to about 8 weight percent.

3. The composition of claim 1 wherein said alumina consists essentially of a material selected from the group consisting of gamma and eta alumina.

4. The composition of claim 2 wherein the hydrogen halide is hydrogen chloride and the catalyst has a chloride content in the range of about 2 to about 3 weight percent.

5. The composition of claim 4 wherein the alkali metal is sodium.

References Cited

UNITED STATES PATENTS

| | | | |
|---|---|---|---|
| 2,739,133 | 3/1956 | Schwarzenbek | 252—442 |
| 2,817,637 | 12/1957 | Porter et al. | 252—442 |
| 2,915,515 | 12/1959 | Juveland et al. | 252—442 X |
| 2,951,885 | 9/1960 | Wade | 252—442 X |
| 3,202,480 | 8/1965 | Nixon | 252—442 X |

DANIEL F. WYMAN, *Primary Examiner.*

EDWARD STERN, *Examiner.*

L. G. XIARHOS, *Assistant Examiner.*